(12) United States Patent
Jung (10) Patent No.: US 7,962,184 B2
(45) Date of Patent: Jun. 14, 2011

(54) METHOD AND APPARATUS FOR CONTROLLING BAR-TYPE MOBILE TERMINAL HAVING DUAL DISPLAY UNIT

(75) Inventor: Kwang Soo Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 732 days.

(21) Appl. No.: 11/965,529

(22) Filed: Dec. 27, 2007

(65) Prior Publication Data

US 2008/0182632 A1 Jul. 31, 2008

(30) Foreign Application Priority Data

Jan. 29, 2007 (KR) .................. 10-2007-0008919

(51) Int. Cl.
*H04M 1/00* (2006.01)
(52) U.S. Cl. ........ 455/575.1; 455/566; 174/50; 345/156
(58) Field of Classification Search .................. None
See application file for complete search history.

(56) References Cited

U.S. PATENT DOCUMENTS

2006/0237209 A1* 10/2006 Horinouchi et al. ............ 174/50
2007/0075965 A1* 4/2007 Huppi et al. .................. 345/156

FOREIGN PATENT DOCUMENTS

| KR | 1020060002562 | 1/2006 |
|---|---|---|
| KR | 1020060002590 | 1/2006 |
| KR | 10-0778024 | 11/2007 |

* cited by examiner

*Primary Examiner* — Phuoc Doan
(74) *Attorney, Agent, or Firm* — The Farrell Law Firm, P.C.

(57) ABSTRACT

A method and apparatus for controlling a bar-type mobile terminal are provided. The method for controlling a bar-type mobile terminal having a first speaker and a first input unit on one side and a second speaker and a second input unit on the other side of the mobile terminal includes receiving a call in a waiting mode; sensing whether a call accept key is input through the first input unit or through the second input unit; activating the speaker located on the same side of the mobile terminal as the call accept key according to the sensing result; and generating a received sound through the activated speaker, thereby enabling a call to be received using both sides of the mobile terminal.

11 Claims, 6 Drawing Sheets

METHOD AND APPARATUS FOR CONTROLLING BAR-TYPE MOBILE TERMINAL HAVING DUAL DISPLAY UNIT

PRIORITY

This application claims priority to an application entitled "METHOD AND APPARATUS FOR CONTROLLING BAR-TYPE MOBILE TERMINAL HAVING DUAL DISPLAY UNIT" filed in the Korean Intellectual Property Office on Jan. 29, 2007 and assigned Serial No. 2007-0008919, the contents of which are incorporated herein by reference.

BACKGROUND OF THE INVENTION

1. Field of the Invention

The present invention relates to a mobile terminal, and in particular, to a method for controlling a mobile terminal having a dual display unit.

2. Description of the Related Art

With the remarkable development of information and communication techniques and semiconductor techniques, various types of mobile terminals have quickly become widespread with increasing use. In particular, recent mobile terminals are not limited to their traditional telephony domain, but share the domain of other electronic applications, thereby resulting in mobile convergence products. For example, mobile phones may have various multimedia functions including a TV showing function (for example, mobile broadcasting such as DMB (Digital Multimedia Broadcasting) or DVB (Digital Video Broadcasting)), a music playing function (for example, MP3) or a photographing function as well as typical communication functions such as voice call or message transmission.

As functions of mobile terminals vary, the mobile terminals provide menus for various functions with various contents (for example, multiple channels of DMB) of each menu.

Accordingly, mobile terminals have been developed to provide an interface for various functions according to characteristics, and some of the mobile terminals are formed of a bar-type having a dual display unit and a dual key input unit installed on both sides of the mobile terminal.

However, when such a mobile terminal receives a call, the mobile terminal executes a call mode using a predetermined side thereof. For this reason, in the case that the mobile terminal is hidden from view of a user, for example carried in a pocket or bag of a user, the user has difficulty in distinguishing each side of the mobile terminal through the sense of touch, and thus the user must remove the mobile terminal from the pocket or bag and turn over the mobile phone to the appropriate side for executing a call mode.

SUMMARY OF THE INVENTION

The present invention is made to solve the above and other problems, and therefore it is an aspect of the present invention to provide a method and apparatus for enabling a call to be received using either side of a bar-type mobile terminal having a dual display unit.

In order to achieve the above-mentioned aspects, in an apparatus for controlling a bar-type mobile terminal according to an exemplary embodiment of the present invention, the apparatus includes a first speaker and a second speaker located on different sides of the mobile terminal; a first input unit located on the same side of the mobile terminal as the first speaker; a second input unit located on the same side of the mobile terminal as the second speaker; a key input sensor for sensing whether a call accept key is input through the first input unit or through the second input unit, when a call is received; and a control unit for activating one of the first speaker and the second speaker according to a call accept signal sensed by the key input sensor and outputting a received sound through the activated speaker.

Preferably, if the key input sensor senses that a call accept signal is input through the first input unit, the control unit activates the first speaker.

Preferably, if the key input sensor senses that a call accept signal is input through the second input unit, the control unit activates the second speaker.

Preferably, the apparatus further comprises at least one microphone.

In order to achieve the above-mentioned aspects, in a method for controlling a bar-type mobile terminal having a first speaker and a first input unit on one side and a second speaker and a second input unit on the other side, the method includes receiving a call in a waiting mode; sensing whether a call accept key is input through the first input unit or through the second input unit; activating the speaker located on the same side of the mobile terminal as the call accept key according to the sensing result; and generating a received sound through the activated speaker.

Preferably, the step of activating the speaker includes activating, if a call accept key is input through the first input unit, the first speaker.

Preferably, the step of activating the speaker includes activating, if a call accept key is input through the second input unit, the second speaker.

Preferably, the step of receiving a call includes displaying the time when a call is received and other call information corresponding to the received call through at least one of the first display unit and the second display unit; and generating a signal informing the call receipt.

Preferably, the signal informing of the call receipt is a ring tone, wherein the ring tone is generated through one of the first speaker and the second speaker; or the signal informing the call receipt is a vibration.

BRIEF DESCRIPTION OF THE DRAWINGS

The above and other aspects, features and advantages of the present invention will become more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Referring to FIGS. 1 to 4, a mobile terminal 100, which is a bar-type mobile terminal, includes a first body 102, a second body 104 coupled to the first body 102, and a hinge module 106 for rotatably coupling the second body 104 to the first body 102. The first body 102 has display units 120 and 130 and speakers 181 and 191 on a front side and a rear side of the first body 102, respectively. The second body 104 has input units 140 and 150 on a front side and a rear side of the second body 104, respectively. The mobile terminal 100 includes microphones 183 and 193 on both sides thereof. Although this exemplary embodiment shows the microphones 183 and 193 installed on both sides of the mobile terminal 100, a microphone may be installed on any one side.

The hinge module 106 is installed at a portion between the front and rear sides of the first body 102 and at a portion between the front and rear sides of the second body 104 so that the second body 104 is rotatably coupled to the first body 102 with regard to a hinge axis (A).

Figure 1:
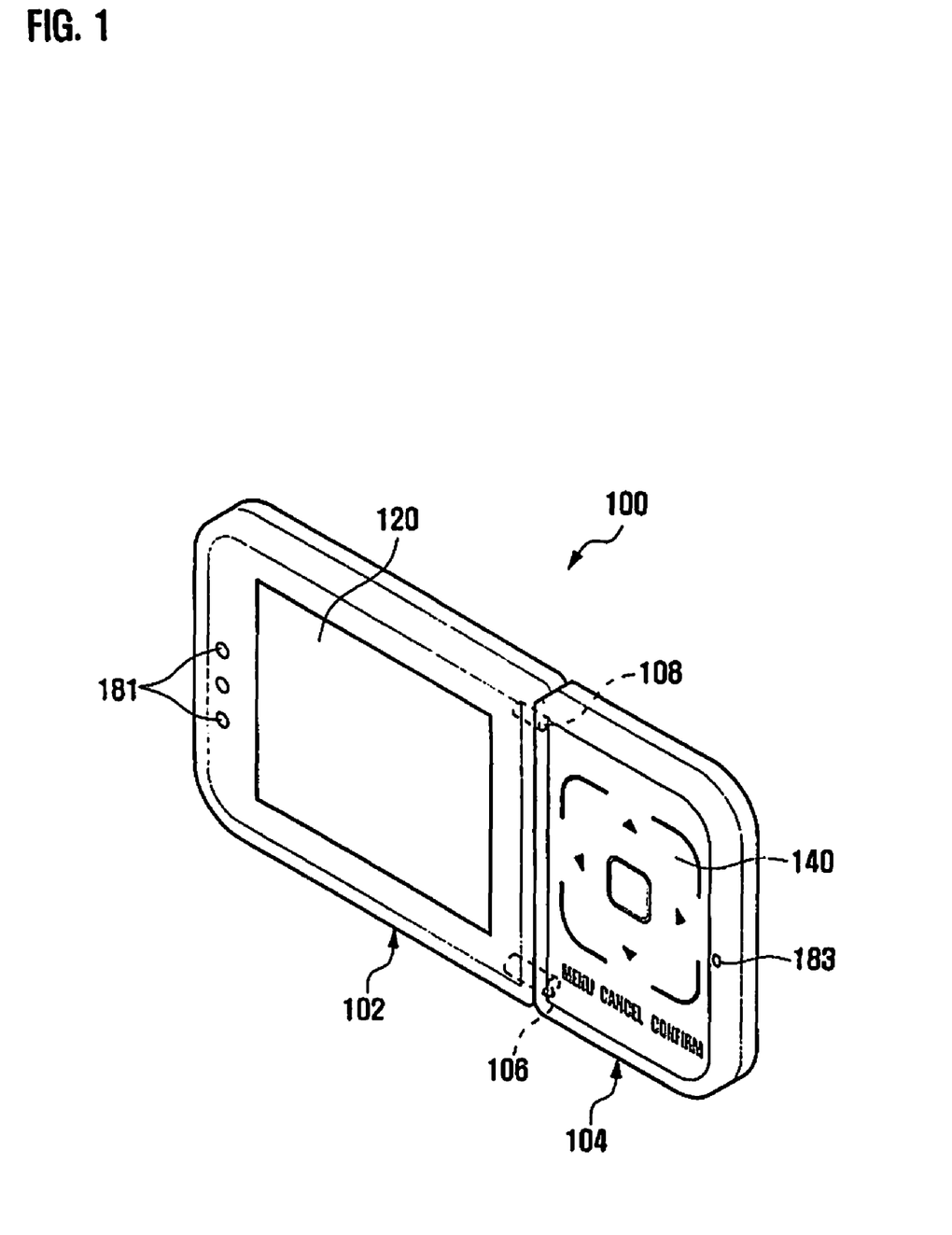
FIG. 1 is a perspective view illustrating a front side of a bar-type mobile terminal having a dual display unit in accordance with an exemplary embodiment of the present invention.
Figure 2:
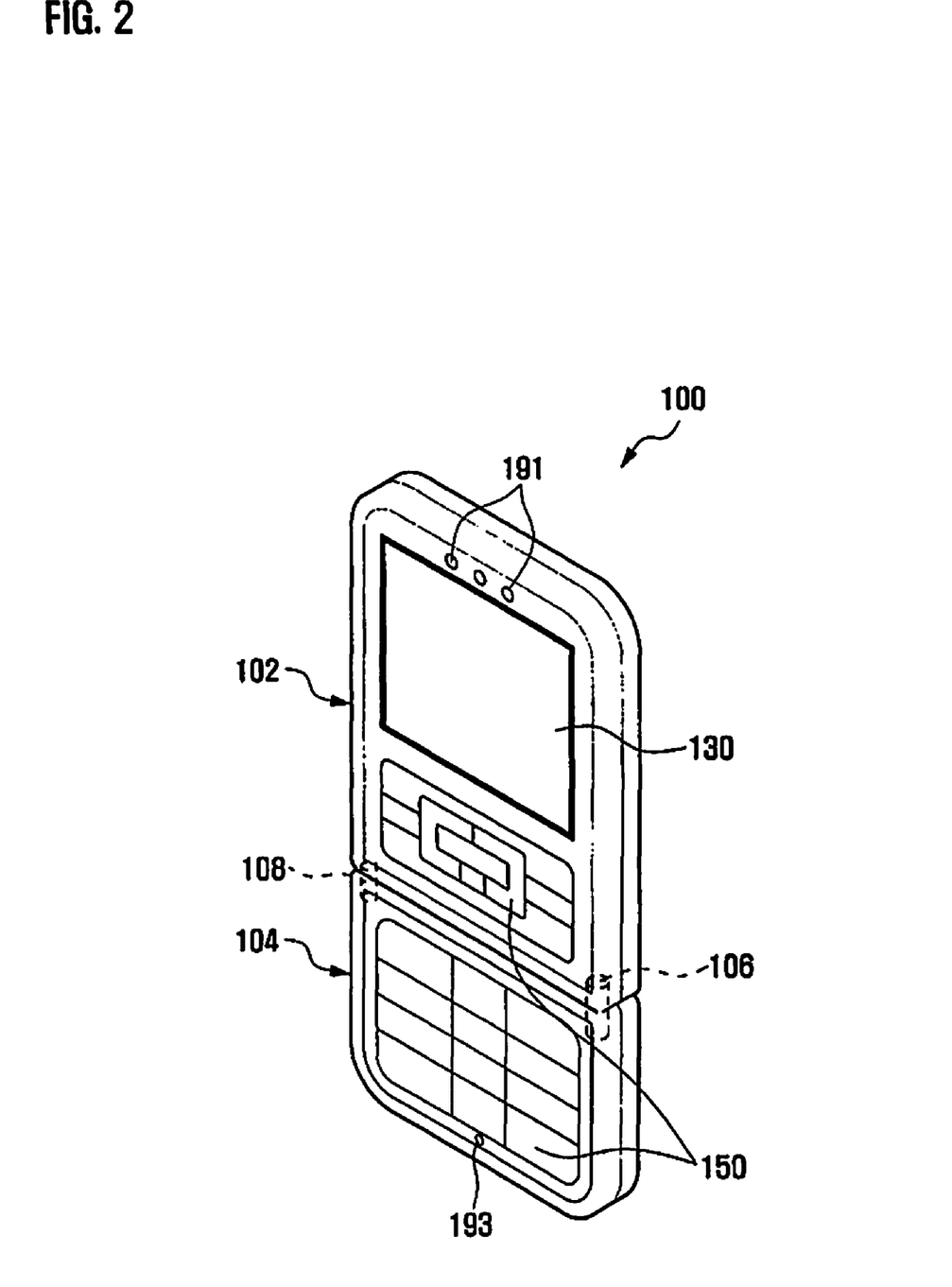
FIG. 2 is a perspective view illustrating a rear side of the mobile terminal of FIG. 1.

The dual display units 120 and 130 of the first body 102 generally use an LCD (Liquid Crystal Display), but may use another display, for example an AMOLED (Active Matrix Organic Light Emitting Diode) display. The dual display units 120 and 130 include a first display unit 120 mounted on the front side of the first body 102 and a second display unit 130 mounted on the rear side of the first body 102, and the first display unit 120 is relatively larger in size and higher in resolution than the second display unit 130. For example, the first display unit 120 may be made of a large-sized QVGA (Quarter Video Graphics Array) LCD, and the second display unit 130 may be made of a small-sized QCIF (Quarter Common Intermediate Format) LCD. However, the present invention is not limited in this regard, for example the dual display units 120 and 130 may have the same size and resolution. The front side and the rear side of the mobile terminal 100 are designated for the convenience of description of the present invention.

The first display unit 120 may provide a multimedia mode showing an execution display of a multimedia function, and the second display unit 130 may provide a call mode showing an execution display of a typical function such as a call function. In this exemplary embodiment, as shown in FIG. 1, the first display unit 120 provides a landscape mode, and as shown in FIG. 2, the second display unit 130 provides a portrait mode. However, the dual display units 120 and 130 of the present invention are not limited in this regard.

The dual speakers 181 and 191 of the first body 102 include a first speaker 181 installed on the same side as the first display unit 120 and a second speaker 191 installed on the same side as the second display unit 130. The first speaker 181 and second speaker 191 are installed at a portion of the first body 102 not adjacent to the second body 104.

The dual input units 140 and 150 of the second body 104 include a first input unit 140 installed on the front side and a second input unit 150 installed on the rear side, and a third input unit composed of a plurality of input buttons may be installed on a side surface of the second body 104. For example, the first input unit 140 may be formed of a touchpad, and the second input unit 150 may be formed of a keypad. The touchpad of the first input unit 140 may include, for example, twelve touch buttons. The touch buttons may include four-directional buttons, a menu button, a cancel button, a confirm button or an exclusive button for a service provider. The keypad of the second input unit 150 may include, for example, 3*4 character/alphanumeric keys, four-directional search keys, and various function keys.

The dual microphones 183 and 193 of the second body 104 include a first microphone 183 installed on the same side as the first input unit 140, and a second microphone 193 installed on the same side as the second input unit 150, and the dual microphones 183 and 193 are installed at a portion of the second body 104 not adjacent to the first body 102. At least one microphone is installed in the second body 104, and the exemplary embodiment of the present invention is hereinafter described for a case in which only the second microphone 193 is installed.

The hinge module 106 is installed between the front and rear sides of the first body 102 and between the front and rear sides of the second body 104. The driving source of the hinge module 106 may provide manual, semiautomatic or automatic operation of rotation of the first body 102 or the second body 104.

Figure 3:
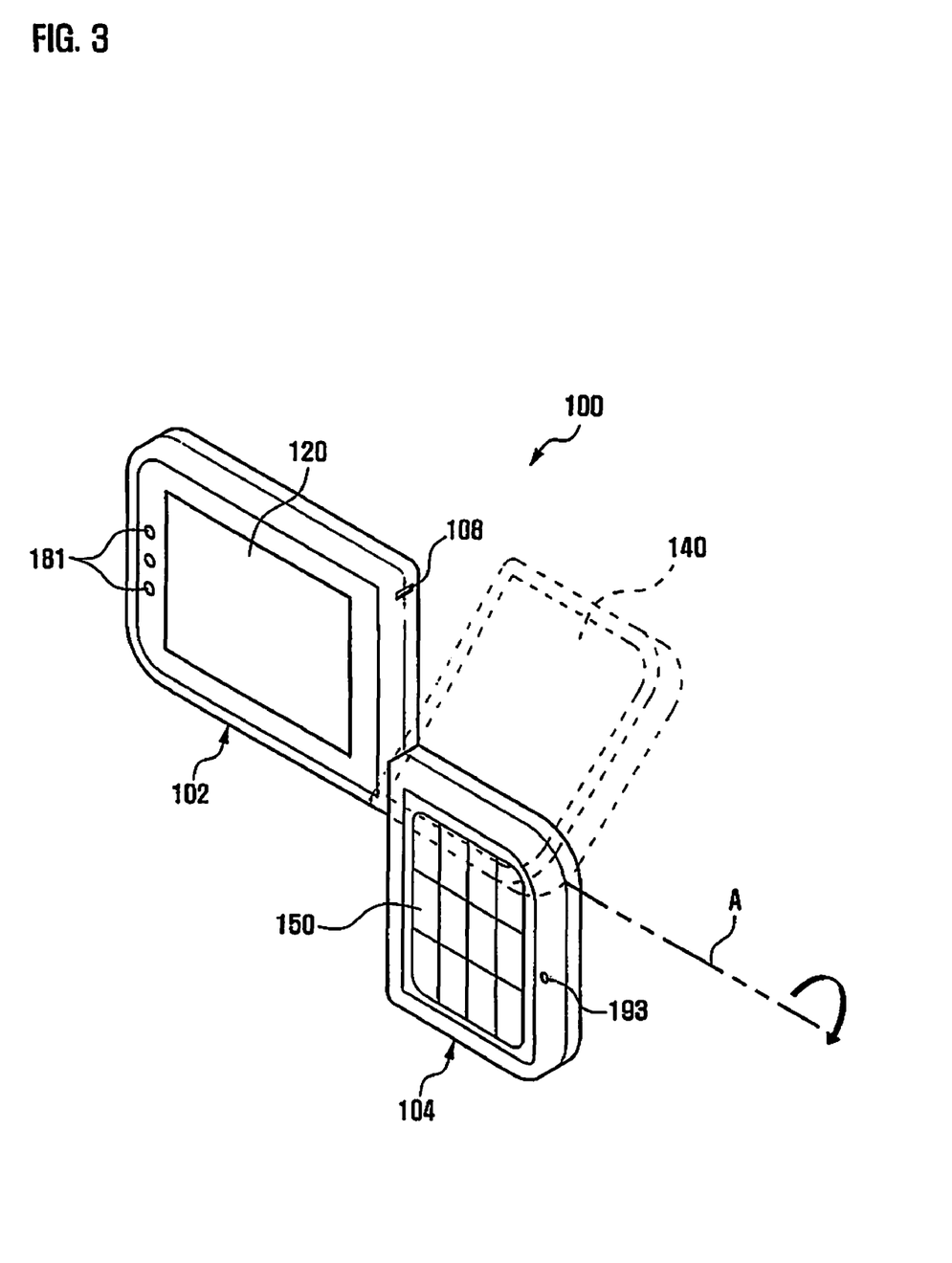
FIG. 3 is a perspective view illustrating the front side of the mobile terminal of FIG. 1 when a second body is rotated by 180 degrees.
Figure 4:
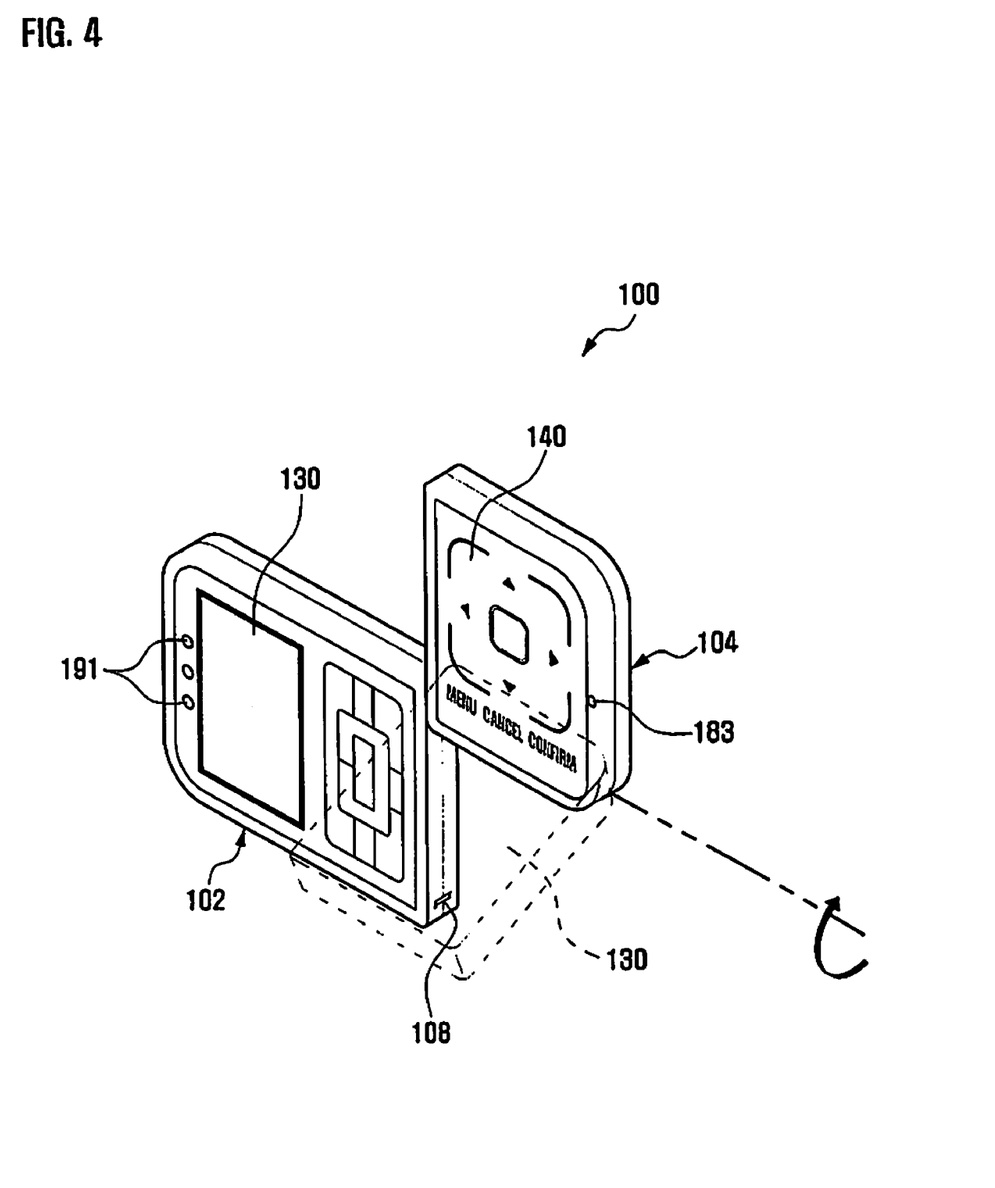
FIG. 4 is a perspective view illustrating the rear side of the mobile terminal of FIG. 1 when a second body is rotated by 180 degrees.

In the manual or semiautomatic operation, the hinge module 106 is configured so that the second body 104 is rotated to a predetermined angle with regard to the first body 102. For example, the predetermined angle may be 0 degrees, 30 degrees to 45 degrees, or 180 degrees. Here, 0 degrees means a normal state of the second body 104, and 30 degrees to 45 degrees and 180 degrees mean a rotated state of the second body 104. FIGS. 1 and 2 show the normal state and FIGS. 3 and 4 show the 180-degree rotated state.

The mobile terminal 100 may further include a locking module 108 installed not adjacent to the hinge module 106 and between the front and rear sides of the first body 102 and between the front and rear sides of the second body 104, so that the first and second bodies 102 and 104 maintain the normal state more stably. The mobile terminal 100 may be changed from the normal state shown in FIGS. 1 and 2 to the rotated state shown in FIGS. 3 and 4, and returned from the rotated state to the normal state by rotation of the second body 104.

Figure 5:
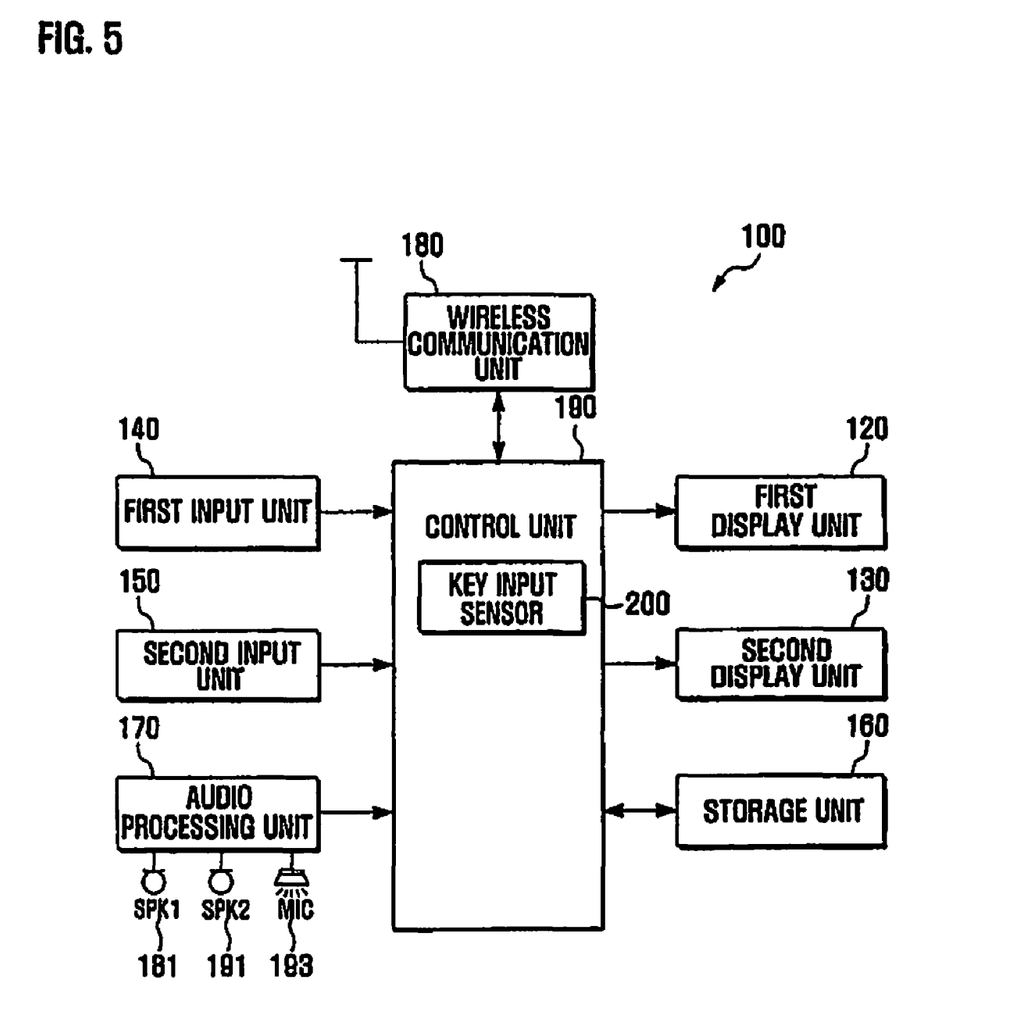
FIG. 5 is a schematic block diagram of a configuration of the mobile terminal of FIG. 1 in accordance with an exemplary embodiment of the present invention.

FIG. 5 is a schematic block diagram of a configuration of the mobile terminal 100 in accordance with an exemplary embodiment of the present invention.

Referring to FIG. 5, the mobile terminal 100 includes the first display unit 120, the second display unit 130, the first input unit 140, the second input unit 150, a storage unit 160, an audio processing unit 170, a wireless communication unit 180 and a control unit 190. The mobile terminal 100 may further include modules for additional functions, for example a digital broadcasting unit, a camera unit and so on, however the details are omitted in the description and drawings, as the modules and their functions are not directly relevant to the present invention.

The first and second display units 120 and 130 visually display various image information related to state and function execution of the mobile terminal 100. At least one of the first display unit 120 and the second display unit 130 is activated to display image information.

The first and second input units 140 and 150 sense input manipulation by a user, generate a corresponding input signal and output the input signal to the control unit 190. In particular, if a ring tone is generated in accordance with an exemplary embodiment of the present invention, any key of the first and second input units 140 and 150 may be used as a call accept key.

The storage unit 160 stores application programs necessary to execute functions in accordance with an exemplary embodiment of the present invention, and user data generated by the user. The storage unit 160 may have at least one buffer for temporarily storing user data occurring during execution of a predetermined application program. The storage unit 160 may have a program area and a data area. The program area stores application programs necessary for an operating system (OS) of the mobile terminal or text messages. In the case that the above-mentioned functions are activated at the request of the user, the functions are provided through corresponding application programs under the control of the control unit 190. The data area stores data occurring according to use of the mobile terminal, including text, still images and moving images. In particular, the storage unit 160 may store information set by a user, such as phone book data.

The audio processing unit 170 reproduces an audio signal received from the control unit 190, and outputs an audio signal, such as a voice signal that is input through the second microphone (MIC) 193, to the control unit 190. That is, the audio processing unit 130 activates one of the first speaker (SPK1) 181 and the second speaker (SPK2) 191 by control of the control unit 190. Further, the audio processing unit 170 converts voice/sound data to an audible sound and outputs the audible sound through the activated speaker 181 or 191, and converts an audio signal such as voice received from the MIC 193 into data and outputs the data.

The wireless communication unit 180 executes various communication functions, including transmitting and receiving user data such as messages to/from external mobile terminals wirelessly. The wireless communication unit 180 may include a radio frequency (RF) transmitting unit for up-converting the frequency of, amplifying and transmitting signals, and an RF receiving unit for receiving low-noise amplifying received signals and down-converting the frequency of the received signals.

The control unit 190 controls the operation of the mobile terminal 100 and signal flows between internal units of the mobile terminal 100. That is, the control unit 190 controls signal flows between the components of the mobile terminal 100, i.e. the first display unit 120, the second display unit 130, the first input unit 140, the second input unit 150, the storage unit 160, the audio processing unit 170, and the wireless communication unit 180. The control unit 190 executes the control operation of the mobile terminal 100, and includes one or two microprocessor chips. If the control unit 190 includes two chips, one of the chips is an exclusive multimedia control chip. In particular, the control unit 190 controls the speakers 181 and 191 and the microphone 193.

The control unit 190 may have a data processing device including a transmitting unit for encrypting and modulating signals to be transmitted through the wireless communication unit 180, and a receiving unit for demodulating and decoding received signals. The data processing device may have a modem and a codec for executing the above-mentioned functions. The codec may include a data codec for processing packet data, and an audio codec for processing audio signals such as voice. The data processing device may be included in the wireless communication unit 180 or be formed of a separate module between the wireless communication unit 180 and the control unit 190.

In particular, the control unit 190 has a key input sensor 200. When a call accept key is input by a user in accordance with an exemplary embodiment of the present invention, the key input sensor 200 senses whether the call accept key is input at the first input unit 140 or at the second input unit 150, and outputs the input signal to the control unit 190.

Figure 6:
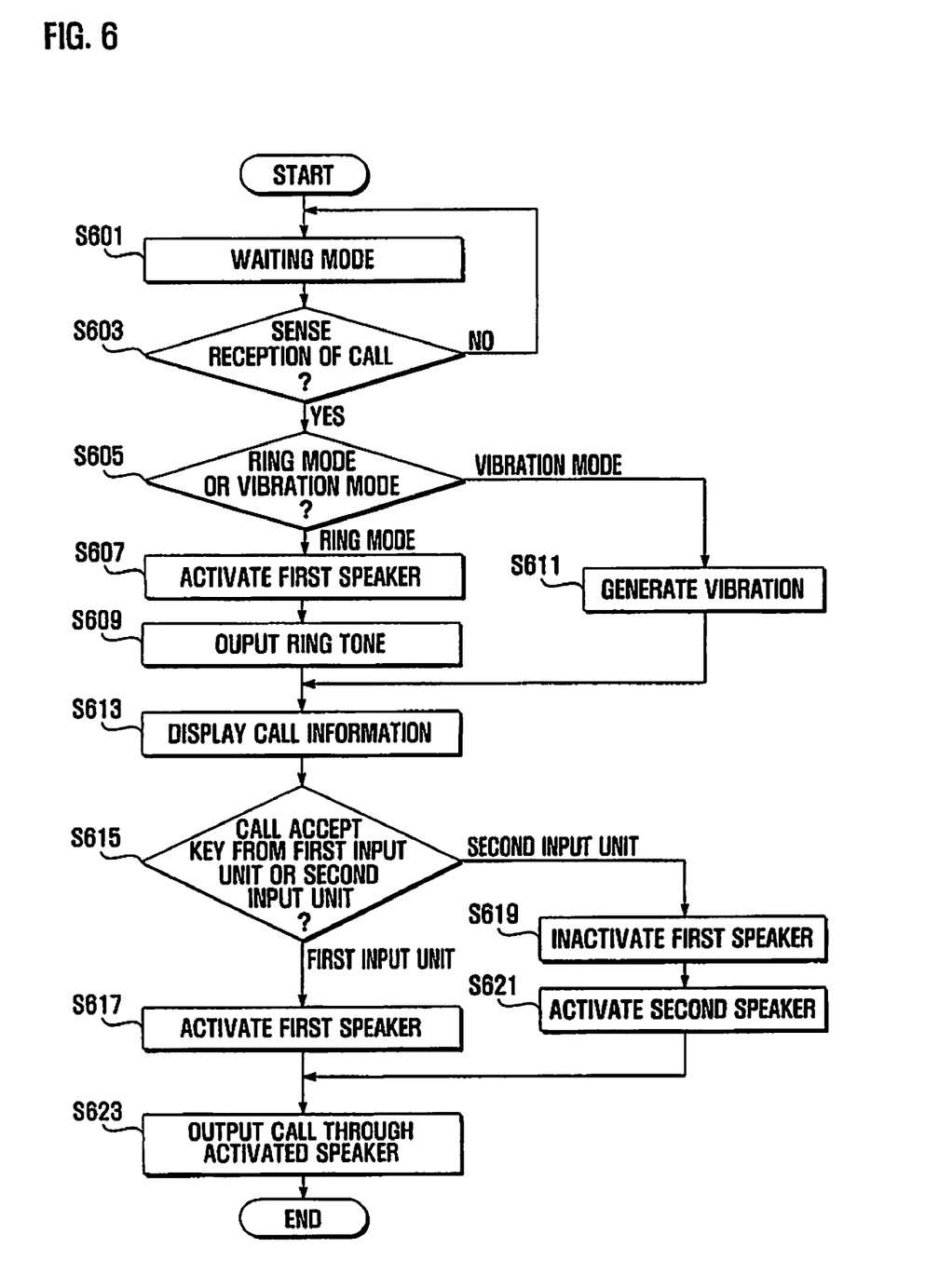
FIG. 6 is a flowchart of a method for controlling a bar-type mobile terminal having a dual display unit in accordance with another exemplary embodiment of the present invention.

FIG. 6 is a flowchart of a method for controlling a bar-type mobile terminal having a dual mode display unit in accordance with another exemplary embodiment of the present invention.

Referring to FIG. 6, the control unit 190 is in a waiting mode in step S601. When the control unit 190 receives a call in the waiting mode, the control unit 190 senses the reception of the call in step S603, and determines whether a mode for generating a call receipt informing signal is a ring mode or a vibration mode in step S605.

If the mode is determined to be a ring mode, the control unit 190 activates the first speaker 181 in step S607 and generates a ring tone through the first speaker 181 in step S609. Here, in a case where a call connecting signal is received at the bar-type mobile terminal from a terminal of a sending party, a ring tone is generated at the bar-type mobile terminal, and at this time, the terminal of the sender generates a ring back tone.

If the mode is determined to be a vibration mode at step S605, the control unit 190 generates a vibration in step S611. Here, the vibration informs a user of the reception of a call, in an alternative manner to the above-mentioned ring tone.

Subsequently, the control unit 190 displays call information through at least one of the dual display units 120 and 130 in step S613. The call information may be simultaneously displayed on the dual display units 120 and 130. In the case that phone book data of the caller is stored in the storage unit 160 of the mobile terminal 100, the call information may include the name and the telephone of the caller. In the case that phone book data of the caller does not exist in the storage unit 160 of the mobile terminal 100, the call information may include a calling telephone number.

When a ring tone or vibration is generated, assuming that the mobile terminal is in a pocket of the user, the user recognizes through a ring tone or vibration that a call connecting attempt is being made, and decides to receive the call. The user removes the mobile terminal from the pocket, and views the call information on any of the dual display units 120 and 130, on which the control unit 190 displays the call information.

When the user inputs any key of the first input unit 140 or the second input unit 150 as a call accept key, the control unit 190 senses through the key input sensor 200 whether the input call accept key is a key of the first input unit 140 or a key of the second input unit 150 in step S615. In the situation where a ring tone or vibration is generated, any key of the first input unit 140 or the second input unit 150 may be a call accept key. That is, when a ring tone or vibration is generated, all of the keys of the first input unit 140 and the second input unit 150 may be call accept keys.

If the control unit 190 senses that the input call accept key is a key of the first input unit 140, the control unit 190 activates the first speaker 181 in step S617. In the case that the first speaker 181 was previously activated at step S607, the control unit 190 maintains the activated state of the first speaker 181. As described above, the first input unit 140 and the first speaker 181 are located on the same side of the mobile terminal 100.

If the control unit 190 senses that the input call accept key is a key of the second input unit 150 at step S615, the control unit 190 inactivates the first speaker 181 in step S619 and activates the second speaker 191 in step S621. As described above, the second input unit 150 and the second speaker 191 are located on the same side of the mobile terminal 100.

The control unit 190 then outputs a received sound to execute a call through the activated first speaker 181 or the activated second speaker 191 in step S623.

As described above, when the user inputs a call accept key for receiving a call, the input unit having the input call accept key and the speaker located on the same side of the mobile terminal 100 as the input unit are activated, and thus the user can receive the call using either side of the mobile terminal, thereby enabling a call to be received without the need for turning over the mobile terminal 100.

Further, a microphone is formed at a lower portion of the mobile terminal, and thus the microphone can easily receive a sound signal such as voice Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

As described above, when receiving a call, the present invention activates an input unit having a call accept key that is input by the user, and activates a speaker located on the same side as the activated input unit. Thus, whichever side of the mobile terminal is selected by the user when the mobile terminal is out of view of the user (for example, when the mobile terminal is carried in the user's pocket), the user can receive a call without the need for turning over the mobile terminal. Therefore, the present invention provides a convenient use of the mobile terminal.

What is claimed is:

1. An apparatus for controlling a bar-type mobile terminal, the apparatus comprising:
   a first body comprising a first speaker and a second speaker located on respectively a first side and a second side of the mobile terminal;
   a second body comprising a first input unit located on the first side and a second input unit located on the second side;
   a key input sensor for sensing whether a call accept key is input through the first input unit or through the second input unit, when a call is received;
   a control unit for activating one of the first speaker and the second speaker located on the same side as the input unit which accepted the call and outputting a received sound through the activated speaker.

2. The apparatus of claim 1, wherein, when the key input sensor senses that the call accept signal is input through the first input unit, the control unit activates the first speaker.

3. The apparatus of claim 1, wherein when the key input sensor senses that the call accept signal is input through the second input unit, the control unit activates the second speaker.

4. The apparatus of claim 1, further comprising at least one microphone.

5. A method for controlling a bar-type mobile terminal having a first speaker and a first input unit on a first side of the bar-type mobile terminal and a second speaker and a second input unit on a second side of the bar-type mobile terminal, the method comprising:
   receiving a call in a waiting mode;
   sensing whether a call accept key is input through the first input unit or through the second input unit when a call is received;
   activating one of the first speaker and the second speaker located on the same side as the input unit which accepted the call; and
   generating a received sound through the activated speaker.

6. The method of claim 5, wherein the step of activating the speaker comprises activating the first speaker when the call accept key is input through the first input unit.

7. The method of claim 5, wherein the step of activating the speaker comprises activating the second speaker when the call accept key is input through the second input unit.

8. The method of claim 5, wherein the step of receiving a call comprises:
   displaying, when a call is received, call information corresponding to the received call through at least one of the first display unit and the second display unit; and
   generating a signal informing the call receipt.

9. The method of claim 8, wherein the signal informing the call receipt is a ring tone.

10. The method of claim 9, wherein the ring tone is generated through one of the first speaker and the second speaker.

11. The method of claim 8, wherein the signal informing the call receipt is a vibration.

* * * * *